United States Patent [19]
Roberts et al.

[11] Patent Number: 4,521,110
[45] Date of Patent: Jun. 4, 1985

[54] DUAL CAVITY LASER GYRO

[75] Inventors: Thomas G. Roberts, Huntsville; Thomas L. Honeycutt, Somerville, both of Ala.

[73] Assignee: The United States of America as represented by the Secretary of the Army, Washington, D.C.

[21] Appl. No.: 449,011

[22] Filed: Dec. 13, 1982

[51] Int. Cl.³ .............................................. G01C 19/64
[52] U.S. Cl. .................................................... 356/350
[58] Field of Search ..................... 356/350; 372/94, 97

[56] References Cited

U.S. PATENT DOCUMENTS

| | | | |
|---|---|---|---|
| 3,741,657 | 6/1973 | Andringa | 356/106 LR |
| 3,811,774 | 5/1974 | Honeycutt et al. | 356/5 |
| 4,035,081 | 7/1977 | Sepp et al. | 356/350 |
| 4,120,587 | 10/1978 | Vali et al. | 356/106 LR |
| 4,219,275 | 8/1980 | Henry | 356/350 |
| 4,429,398 | 1/1984 | Chenausky et al. | 372/97 X |

OTHER PUBLICATIONS

Honeycutt et al., "FM–CW Radar Range Measurement with a $CO_2$ Laser", IEEE Journal of Quantum Electronics, vol. QE-8, No. 2, pp. 91–21, Feb. 1972.
Matthews et al., "A High Resolution Laser Gyro," National Aerospace and Electronics Conference, (Preprint, pp. 1–13), May 16–18, 1978.
Dorschner et al., "A Manganese Bismuth Magnetic Mirror for the Raytheon Laser Gyro," National Aerospace and Electronics Conference, (5 pages), May 16–18, 1978.
Smith et al., "Biasing the Raytheon Four-Frequency Ring Laser Gyroscope," SPIE Vol. 157, Laser Inertial Rotational Sensors, (1978), pp. 21–29.
Dorschner et al., "Laser Gyro at Quantum Limit", IEEE Journal of Quantum Electronics, vol. QE-16, No. 12, Dec. 1980, pp. 1376–1379.

Primary Examiner—Vincent P. McGraw
Attorney, Agent, or Firm—Anthony T. Lane; Robert P. Gibson; Freddie M. Bush

[57] ABSTRACT

A laser gyro having two cavities which are physically separated so that neither mode volumes have any common parts. Each cavity supports a wave traveling in only one direction either clockwise or counter-clockwise. Other waves, which are normally set up in a ring laser gyro, are prevented by a reversed feedback mirror. The gyro produces two waves whose frequencies are shifted in opposite directions by rotation. Lock-in is not possible. The two frequencies are mixed and the beat frequency is detected by optical heterodyne techniques. The response of this rotation sensor is linear down to zero rotation rate and its accuracy is limited by quantum effects.

12 Claims, 2 Drawing Figures

DUAL CAVITY LASER GYRO

DEDICATORY CLAUSE

The invention described herein may be manufactured, used, and licensed by or for the Government for governmental purposes without the payment to us of any royalties thereon.

BACKGROUND OF THE INVENTION

The development of rotation sensors which eliminate spinning-mass gyroscopes with their many moving parts, high cost, complexity, and in some cases inaccuracy and unreliability has led to many different approaches. Passive ring sensors, such as the multi-turn, single-pass fiber optic interferometer and the multi-pass, single-turn open resonator lack the sensitivity required for high accuracy. The active approaches, such as ring laser gyros, are much more promising.

The conventional ring laser gyro is based on two counter-rotating optical resonator modes. These modes split in frequency when the gyro rotates about its sensitive axes. The frequence split, which is proportional to the rotation rate and the area enclosed by the optical mode is measured by the use of optical heterodyne detection of the two frequencies. In practice, however, there is always some scattering of light from one mode into the other which causes the well-known lock-in phenomena. As a result, the two frequencies tend to be locked together and do not split for low rotation rates. These two optical modes, which occupy the same physical space, are degenerate due to injection locking and the degeneracy is not easily removed. This causes a dead band in the gyro output which may be as wide as 2,000 degrees/hour. Furthermore, even for rotation rates above the lock-in threshold, the output remains a nonlinear function of rotation rate.

Methods to circumvent lock-in have led to the development of a variety of sensors. Most approaches try to remove the degeneracy and overcome this problem by applying nonreciprocal bias to the gyro output frequency either by rotating the gyro or by inserting into the cavity an optical element such as a magnetic mirror or a Faraday cell. But large biases are required and bias drifts produce large inaccuracies. An improvement is obtained when the bias is intentionally reversed "exactly" one-half the time by mechanical or electro-optical dithering. The main drawback to the dither scheme is that the gyro passes through the lock-in region at twice the dither rate. Each time the gyro leaves lock-in it loses its memory of phase and thus, an error of a fractional count accumulates once per cycle. These errors add randomly giving an angular error which increases as the square root of elapsed time. This type of error source is particularily serious for short measurement times where the uncertainty corresponds to a large percent error in the apparent rotation rate. In all cases the use of a single bias element to circumvent lock-in have seriously compromised the inherent potential of the ring laser rotation sensor.

It must be realized that the two counter rotating modes of a conventional ring laser may be considered as four degenerate modes when polarization is taken into account. Each longitudinal mode can oscillate as any of four distinct waves, a clockwise (CW) and a counterclockwise (CCW) traveling wave, with each having either of two arbitrary orthogonal polarizations. All four of these possible waves have identical unperturbed resonance frequencies, thereby allowing very small amounts of backscatter to accomplish mutual phase locking. It is this four-fold frequency degeneracy that causes the lock-in difficulties. If the modes had different resonance frequencies or if they did not occupy the same physical volume so that scattering could not cause lock-in, the problems inherent in those devices would be circumvented. Realization of a four-frequency or multioscillator laser gyro which circumvents the lock-in problem requires that this degeneracy be fully removed. That is, both the directional degeneracy and the polarization degeneracy must be removed. This would allow simultaneous oscillation at four different frequencies for each longitudinal cavity mode. As in the case of the biased ring laser gyro discussed above, the directional degeneracy can be removed by inserting into the cavity a non-reciprocal (direction-dependent) polarization rotator. This produces different resonant frequencies for the CW and the CCW waves. The polarization degeneracy can then be removed by inserting into the cavity a reciprocal (direction-independent) rotator. This produces different resonant frequencies for the right circular polarized wave and the left circular polarized wave which are traveling in the same direction. It is this last element which makes this ring laser gyro differ from the others. The use of these two passive bias elements in the cavity do fully remove the four-fold degeneracy and circumvent lock-in. In this context, reference to a passive element means that the element does not interact with the beam in a manner that causes gain. This does not mean that the passive element does not interact with the beam in other ways; neither does it mean that losses are not introduced.

Disadvantages of the four-frequency ring laser gyro are primarily associated with the losses produced by the polarization rotators introduced into the optical cavity and, in particular, with the nonreciprocal polarization rotator. This nonreciprocal polarization rotation may be accomplished by the use of Zeeman biasing in the gain medium, by the use of the magneto-Kerr effect in a magnetic mirror, by the use of the Faraday effect in a Faraday cell, or possibly by some other means. All of these are lossy and decrease the Q of the cavity which increases the linewidth of the passive cavity resonance. This places severe requirements on the biasing of this element. These losses also increase the pumping requirements on the active medium because the gain curve will have to be maintained above the threshold over the entire frequency band of interest.

Another technique used to prevent lock-in is to use two optical fiber waveguides as separate ring lasers with cavities spatially separated, and to cause each cavity to contain traveling waves in only one direction. The disadvantages of the fiber waveguide ring laser gyroscope are primarily associated with inherent properties of the fibers. Additionally, the nature of lasers which may be utilized as active media in these devices also cause major problems which actually prevents the sensitivity that is required for high accuracy. Components used to selectively restrict the direction of travel of the laser oscillation in each waveguide can actually be lossy even to the wave traveling in the desired direction. Similarly, output coupling techniques such as scattering light out of an optical fiber is, necessarily, inherently lossy. Additionally, for ring lasers the optical fibers are bent. This bent or curved fiber and the nature of optical fibers also cause losses. These losses make the optical fiber waveguide a very low Q cavity, at best. Herein, low Q cavity means that the oscillations in the waveguide cavity are far from monochromatic and cannot be used in heterodyne detection techniques to measure the small frequency shift produced by low rotation rates. Also, the light travels around the optical fiber waveguide by internal reflections, and this means that the phase matching requirement will be met for a wide band of wavelengths. The requirement for zero phase shift around the cavity means that the number of wavelengths of the oscillator must be equal to an integer. This means that C/L (the speed of light C divided by the total length of the oscillator L) must be an integer. L is the optical path length, which is different from the geometrial length of the fiber waveguide. Therefore, for each longitudinal mode there is a band of wavelengths which satisfy this requirement for a given length fiber. Thus the fiber waveguide cavity can oscillate over a broad band of frequencies. This again tends to produce an output which is not useful in heterodyne detection at the sensitivities required. Optical fibers also exhibit birefringence. Thus, the optical fibers is a non-reciprocal element contained in the cavity which causes frequency shifts as a function of intensity of the radiation in the cavity. These frequency shifts appear as rotations in a non-rotating system and as errors in a rotating system. This source of errors might be masked by making the band width of the radiation in the cavity much larger than any frequency shifts which may be produced by the optical Kerr effect. However, this again limits the sensitivity and the usefulness of the fiber optic waveguide laser gyro.

All of the above effects place severe requirements on the active medium for an optical fiber laser because the gain curve will have to be maintained above threshold over the entire frequency band of interest. The two active media which may be used in the fiber optic waveguide ring laser gyro are the laser diode and possibly a fiber laser. The laser diode is inherently a broad band source and, when coupled with an inherently low Q cavity, it produces a very insensitive instrument. To overcome the above losses, the laser would have to be pumped hard, which in itself tends to amplify the problem. A fiber laser would be optically pumped. Optical pumps are inherently very broad band, and much of the unwanted, broadband, light would be trapped by the fiber waveguide. This unwanted light becomes noise on the signal which causes an additional limitation on the sensitivity.

SUMMARY OF THE INVENTION

A laser gyro having two adjacent laser cavities which are separated physically so that there are no common parts between the respective mode volumes thereof. Each cavity supports a wave traveling in only one direction, one traveling clockwise, the other traveling counter-clockwise. Other waves, which normally occur in a ring laser gyro, are prevented from occuring by a reversed feedback mirror. The gyro produces two output waves whose frequencies are shifted in opposite directions by rotation. The two frequencies are mixed and the resultant beat frequency is detected by optical heterodyning. The response is a linear output signal. Very low rotation rates may be sensed down to zero rotation and its accuracy is limited by quantum effects.

DESCRIPTION OF THE PREFERRED EMBODIMENT

Figure 1:
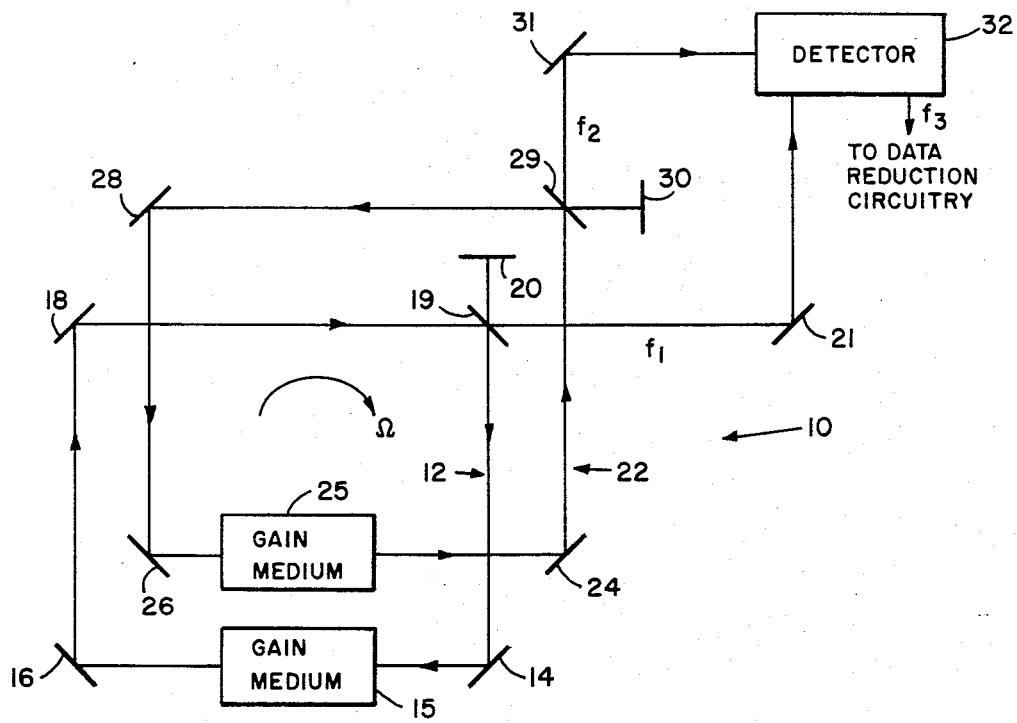
FIG. 1 is a schematic of a preferred embodiment of the dual cavity ring laser gyro.

In providing rotational motion measurements and especially for rotation at very low frequencies, a dual cavity laser gyro as set forth in FIG. 1 may be used. As shown in FIG. 1, the dual cavity laser gyro 10 comprises two nearly identical cavities 12 and 22 which are in adjacent parallel planes being physically separated; therefore, lock-in cannot occur. Cavity 12 comprises fully reflecting turning mirrors 14, 16, and 18, a gain medium 15 and a partially reflecting mirror 19. Gain medium 15 is disposed between mirrors 14 and 16. Partially reflecting mirror 19 is disposed between mirrors 14 and 18. A negative feedback mirror 20 is behind mirror 19 in optical alignment with mirror 14. Output mirror 21 is behind mirror 19 in optical alignment with mirror 18. In a similar arrangement, cavity 22 comprises turning mirrors 24, 26 and 28, a gain medium 25 and a partially reflecting mirror 29. Mirror 30 provides negative feedback and mirror 31 couples out the output signal. Energy outputs from mirrors 21 and 31 are coupled to a heterodyne detector 32 where they are combined to provide a beat frequency output. A single traveling wave at a frequency $f_1$ in cavity 12 and a single traveling wave at a frequency $f_2$ in cavity 22 is set up by the gain mediums 15 and 25 respectively; one wave traveling CW and the other wave traveling CCW. This is accomplished in the respective cavities by appropriately placed mirrors 20 and 30 which produce negative or reverse feedback for the waves that would be traveling in the opposite direction in each cavity. The resonant frequencies of the two cavities are not equal since small differences in the respective cavity lengths cause them to be oscillating at different frequencies. They are extracted from the cavities by partially reflecting mirrors 19 and 29, and are detected using optical heterodyne techniques to produce a difference frequency $f_3 = (f_1 - f_2)$ in the absence of rotation. In the equation $f_1$ is assumed to be the larger of the two frequencies. Upon rotation the resonance frequency of one cavity is increased while the other is decreased. Thus, $f_3$ is a function of the rotation rate and rotation causes a change, $\Delta f_3$, in $f_3$. The resonant frequency of an optical path in a ring is dependent on $A \cdot \Omega$ where A is the area inclosed by the optical path and $\Omega$ is the rate of rotation. Therefore, we have for $\Delta f_3$ $$\Delta f_3 = \Delta f_1 - \Delta f_2, \tag{1}$$

and since one frequency is shifted up and the other is shifted down we have $$|\Delta f_3| = \left[ \frac{2A_1 \cdot \Omega}{L_1 \lambda_1} + \frac{2A_2 \cdot \Omega}{L_2 \lambda_2} \right] \text{ or,} \tag{2}$$

$$|\Delta f_3| = \left[ \frac{2A_1}{L_1 \lambda_1} + \frac{2A_2}{L_2 \lambda_2} \right] \cdot \Omega \tag{3}$$

here $L_1$ and $L_2$ are the lengths around the optical paths of the two cavities, and $$\left[\frac{2A_1}{L_1\lambda_1} + \frac{2A_2}{L_2\lambda_2}\right]$$

is known as the scale factor.

In operation, the gain mediums 15 and 25 initiate oscillation of the respective frequencies $f_1$ and $f_2$ in their respective cavities which results in the beat frequency $f_3$ output. When planar rotation of the two cavities occurs a shift in the output frequency occurs such that the output becomes $f_3 \pm \Delta f_3$ which indicates the direction of rotation and the degree or speed of rotation, as is well known from heterodyne circuits.

While two gain media are shown, both optical modes could be made to pass through the same gain medium and still have their optical mode volumes physically separated. A common gain medium is a preferred embodiment since it requires only one power supply to pump the gain medium and it helps to insure that each wave sees the same small changes in the gain medium if there is any.

Figure 2:
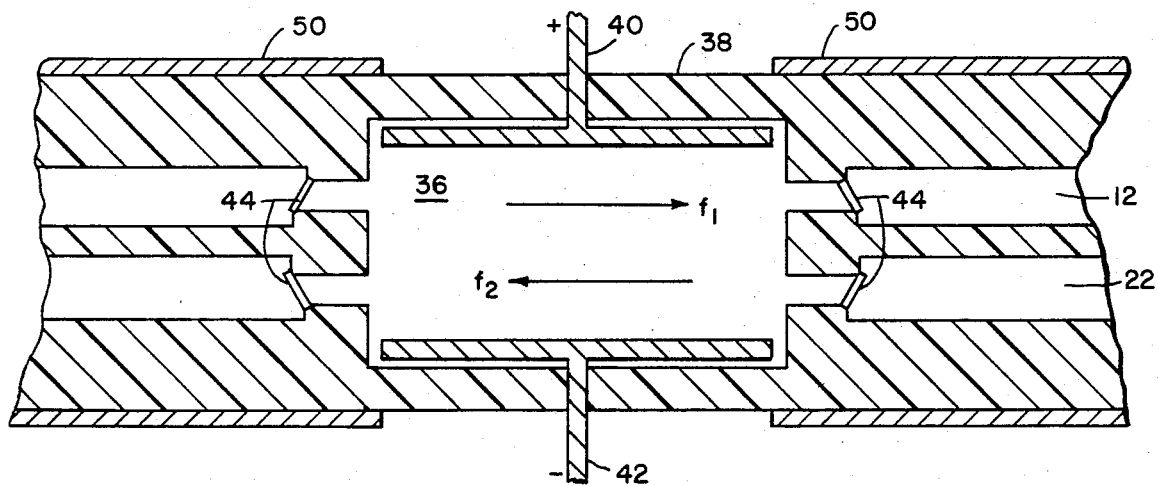
FIG. 2 is a simplified view, shown cutaway, of a common gain medium for the embodiment of FIG. 1.

As shown in FIG. 2, this is accomplished by replacing the gain media 15 and 25 of FIG. 1 by the single gain medium 36 which is part of both cavities 12 and 22. The cavities 12 and 22 and the gain medium 36 are located inside a common material 38 of fairly low coefficient of thermal expansion such as quartz, and selected glass and metal alloys. For example, glass sold under the trademark Pyrex may be used or an alloy sold under the trademark Invar may be used. Typically, gain medium 36 is pumped by a discharge produced between electrodes 40 and 42. For this case the gain medium can be an $N_2$-$CO_2$ laser, a He-Ne laser or any other electric discharge laser (EDL). Windows 44 couple the frequencies $f_1$ and $f_2$ between medium 36 and the remaining portion of the respective cavities. The particular material comprising windows 44 depends on which gain medium is being used. The remaining portion of cavities 12 and 22 may either be evacuated or filled with a gas which is nonresonant with the frequencies $f_1$ and $f_2$. For example, $N_2$ can be used with the $N_2$-$CO_2$ gain medium and He or $N_2$ with the He-Ne gain medium. Numerous other gases could also be used, including dry air and Argon.

The gain medium 36 need not be an EDL. For example an optical pumped Nd-YAG laser crystal, Dimethyol-Oxatricarbocyanine-Iodine dye, or other optically pumped crystals and dyes can be used. When optical pumping is used with a housing 38 that is transparent the top and bottom surfaces of the material block 38 which contains the gyro are plated with a reflecting coating 50 like aluminum (Al) or silver (Ag) except in the area where gain medium 36 is contained. The gain medium 36 is optically pumped from both the top and the bottom and the reflecting coatings 50 keeps the broad-band pump light from entering cavities 12 and 22 where it might become noise on the signals.

The turning mirrors may be mirrors of various types such as dielectric coated mirrors for helium-neon lasers and other lasers in the visible region of the spectrum, or gold plated mirrors for the IR region. The mirrors are mounted into the material where the cavities are cut. In some cases one turning mirror may be large enough to work for both cavities. In other cases these mirrors may be the results of total internal reflection and no extra turning mirror is required. Also a combination of total internal reflection and turning mirror may be used.

The dual cavity ring laser gyro uses only two frequencies, and has no lossy elements. The normal lossy bias elements are not necessary since lock-in is avoided by separating the cavities and each cavity contains only a vacuum or a nonresonant gas. Therefore, it is not necessary to supply large electric or magnetic fields to drive them. The response of the gyro device is linear; its accuracy is limited by quantum noise. The lock-in phenomenon cannot occur. The possibility of lock-in is removed by using two nearly identical optical cavities which are separated physically. A single traveling wave is set up in each of these cavities, one traveling CW and the other traveling CCW. The resonant frequency of two cavities is different because small differences in optical path length cause them to be oscillating in different longitudinal modes. If they did oscillate at the same frequency lock-in would still not occur because these modes are not degenerate; that is, they are separated in phase space by the spatial part of their phase space coordinates. Single traveling waves are set up and maintained by the method of negative feedback as discussed by T. E. Honeycutt and W. F. Otto, in "FM-CW Radar Range Measurement with a $CO_2$ Laser", IEEE Journal of Quantum Electronics, Vol. QE-8, No. 2, 1972 pages 91–92. The two cavities can be made nearly identical by making them in the same piece of material. The cavity material 38 may vary depending on which laser is used and on the application for which the gyro is to be used. The cavity may be a vacuum or a non-resonant gas that is transparent at the particular frequency $f_1$ or $f_2$. It is a true resonant cavity wherein the wave always travels in straight lines even though the direction is changed by reflection.

Regardless of whether separate gain mediums 15 and 25 are used or a common medium 36 is used the housing or material 38 is arranged so that one cavity lies directly above the other within the common medium and having a common central axis normal to the planes of the cavities.

Although the present invention has been described with reference to the preferred embodiments workers skilled in the art will recognize that changes may be made in form and detail without departing from the spirit and scope of the invention. Accordingly, the scope of the invention should be limited only by the claims appended hereto.

We claim:

1. A dual cavity laser gyro for determining angular rotation of an area, comprising: first and second, parallel, optical paths each circumscribing an area of 360° and each providing a resonant cavity, a common gain medium disposed in the respective optical paths for providing physically separated optical mode volumes and for inducing separate laser oscillation in each cavity, first and second means coupled respectively to said first and second optical cavities for providing negative feedback therein for limiting laser oscillation to a single traveling wave in each cavity, said traveling wave in said first cavity being in the opposite direction to said traveling wave in the second cavity, means for extracting a portion of the laser oscillation from each cavity, and means for heterodyning the portions of removed laser oscillation for providing a beat frequency output.

2. A dual cavity laser gyro as set forth in claim 1 wherein each of said cavities further comprise a plurality of turning mirrors therein for directing laser oscillation therein in respective straight line paths around said 360° area.

3. A dual cavity laser gyro as set forth in claim 2 wherein said gain medium is selected from the group consisting of electric discharge lasers and optically pumped lasers.

4. A dual cavity laser gyro as set forth in claim 3 wherein said first and second means for providing negative feedback comprise first and second retroreflecting mirrors coupled adjacent said means for extracting, and said means for extracting being first and second partially reflective mirrors in respective first and second cavities.

5. A dual cavity laser gyro as set forth in claim 4 wherein said first and second optical paths provide said resonant cavities in a non-resonant gas medium which is transparent to the laser oscillation frequency.

6. A dual cavity laser gyro for determining angular rotation of an area, comprising: first and second, parallel, optical, resonant cavities each circumscribing an area of 360°, first and second separate gain mediums disposed in respective of said cavities for providing separate optical mode volumes and for inducing separate laser oscillations in each cavity, first and second feedback means coupled respectively to said first and second optical cavities for providing negative feedback therein for limiting laser oscillation to a single traveling wave in each cavity, said traveling wave in said first cavity being in the opposite direction to said traveling wave in the second cavity, means for extracting a portion of the laser oscillation from each cavity, and means for heterodyning the portions of removed laser oscillation for providing a beat frequency output.

7. A dual cavity laser gyro as set forth in claim 6 wherein said first and second means for providing negative feedback is first and second retroreflecting mirrors coupled adjacent said means for extracting, and further comprising a plurality of turning mirrors within each of said cavities for directing laser oscillation therein in respective straight line paths around a closed loop.

8. A cavity laser gyro as set forth in claim 7 wherein said means for extracting is first and second partially reflective mirrors in respective said first and second cavities.

9. A dual cavity laser gyro as set forth in claim 8 and further comprising a non-resonant gas medium, said first and second optical paths being resonant cavities within said non-resonant gas medium that is transparent to the oscillation frequency.

10. A dual cavity laser gyro as set forth in claim 9 wherein said non-resonant gas medium is selected from the group consisting of $N_2$, He, A, and dry air.

11. A dual cavity laser gyro as set forth in claim 9 wherein said resonant cavities are in a vacuum.

12. A dual cavity laser gyro as set forth in claim 9 wherein said gain medium is selected from the group consisting of electric discharge lasers and optically pumped lasers.

* * * * *